United States Patent
Oh et al.

(10) Patent No.: US 11,217,783 B2
(45) Date of Patent: Jan. 4, 2022

(54) NEGATIVE ELECTRODE ACTIVE MATERIAL FOR LITHIUM SECONDARY BATTERY, NEGATIVE ELECTRODE INCLUDING THE SAME, AND LITHIUM SECONDARY BATTERY INCLUDING THE NEGATIVE ELECTRODE

(71) Applicant: Samsung SDI Co., Ltd., Yongin-si (KR)

(72) Inventors: Seyoung Oh, Yongin-si (KR); Hyunchul Kim, Yongin-si (KR); Hyun Soh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 88 days.

(21) Appl. No.: 16/225,435

(22) Filed: Dec. 19, 2018

(65) Prior Publication Data

US 2019/0198857 A1    Jun. 27, 2019

(30) Foreign Application Priority Data

Dec. 22, 2017   (KR) .......................... 10-2017-0178736

(51) Int. Cl.
*H01M 4/04*          (2006.01)
*H01M 4/133*         (2010.01)
(Continued)

(52) U.S. Cl.
CPC ........... *H01M 4/133* (2013.01); *C01B 32/205* (2017.08); *C01B 32/21* (2017.08); *H01M 4/0471* (2013.01);
(Continued)

(58) Field of Classification Search
CPC ........ H01B 1/04; H01M 4/133; H01M 4/362; H01M 4/364; H01M 4/366; H01M 4/583;
(Continued)

(56) References Cited

U.S. PATENT DOCUMENTS 4,169,040 A * 9/1979 Bea ..................... C10G 65/02
208/59
5,028,500 A   7/1991 Fong et al.
(Continued)

FOREIGN PATENT DOCUMENTS

| CN | 1214554 A | 4/1999 |
| CN | 1228619 A | 9/1999 |

(Continued)

OTHER PUBLICATIONS

English machine translation of Choi et al. (KR-20130058466-A). (Year: 2013).*

(Continued)

*Primary Examiner* — Matthew R Diaz
(74) *Attorney, Agent, or Firm* — Lewis Roca Rothgerber Christie LLP

(57) ABSTRACT

A composite negative electrode active material includes: a first carbon-based material; and a second carbon-based material on a surface of the first carbon-based material, wherein the first carbon-based material and the second carbon-based material have respective particle diameters that are different from each other.

18 Claims, 6 Drawing Sheets

(51) Int. Cl.
*H01M 4/1393* (2010.01)
*H01M 4/36* (2006.01)
*H01M 10/0525* (2010.01)
*H01M 4/02* (2006.01)
*H01M 4/583* (2010.01)
*C01B 32/21* (2017.01)
*C01B 32/205* (2017.01)
*H01M 4/62* (2006.01)
*H01M 4/587* (2010.01)

(52) U.S. Cl.
CPC ......... *H01M 4/1393* (2013.01); *H01M 4/366* (2013.01); *H01M 4/583* (2013.01); *H01M 4/587* (2013.01); *H01M 4/625* (2013.01); *H01M 10/0525* (2013.01); *H01M 2004/021* (2013.01); *H01M 2004/027* (2013.01)

(58) Field of Classification Search
CPC ...... H01M 4/625; H01M 4/96; H01M 10/052; H01M 10/0525; H01M 10/054; H01M 2004/021; H01M 2004/027; H01M 4/0471; H01M 4/1393
See application file for complete search history.

(56) References Cited

U.S. PATENT DOCUMENTS

| | | | |
|---|---|---|---|
| 5,250,491 A | 10/1993 | Yan | |
| 5,401,598 A | 3/1995 | Miyabayashi et al. | |
| 6,030,726 A | 2/2000 | Takeuchi et al. | |
| 6,342,319 B1 | 1/2002 | Kuboki et al. | |
| 6,355,377 B1 | 3/2002 | Sheem et al. | |
| 6,395,427 B1 | 5/2002 | Sheem et al. | |
| 6,432,583 B1 | 8/2002 | Fukuda et al. | |
| 6,482,547 B1 * | 11/2002 | Yoon | H01M 4/133 429/218.1 |
| 7,485,395 B2 * | 2/2009 | Kim | H01M 4/133 429/212 |
| 7,781,103 B2 * | 8/2010 | Sheem | H01M 4/0471 429/231.8 |
| 8,366,892 B2 * | 2/2013 | Kraus | H01M 4/96 204/294 |
| 8,440,352 B2 * | 5/2013 | Sheem | H01M 4/0471 252/182.1 |
| 8,501,047 B2 * | 8/2013 | Yamamoto | H01M 4/133 252/502 |
| 8,974,966 B2 * | 3/2015 | Kim | H01M 4/387 429/231.8 |
| 9,142,836 B2 * | 9/2015 | Chang | H01M 4/587 |
| 10,923,721 B2 | 2/2021 | Ko et al. | |
| 2004/0137328 A1 | 7/2004 | Kim et al. | |
| 2005/0014067 A1 | 1/2005 | Tenno et al. | |
| 2016/0276657 A1 | 9/2016 | Song et al. | |
| 2017/0047585 A1 | 2/2017 | Xia et al. | |
| 2017/0194650 A1 * | 7/2017 | Mihara | C01B 32/05 |
| 2017/0200941 A1 * | 7/2017 | Yuge | C04B 35/63496 |
| 2017/0352868 A1 * | 12/2017 | Zhamu | H01M 4/133 |
| 2018/0069266 A1 * | 3/2018 | Kim | H01M 10/0569 |
| 2018/0190985 A1 * | 7/2018 | Choi | H01M 4/364 |

FOREIGN PATENT DOCUMENTS

| | | | | |
|---|---|---|---|---|
| CN | 1301048 A | 6/2001 | | |
| CN | 1301052 A | 6/2001 | | |
| CN | 105244477 A | 1/2016 | | |
| CN | 105655542 A | 6/2016 | | |
| JP | 4-368778 A | 12/1992 | | |
| JP | 5-275076 A | 10/1993 | | |
| JP | 8-12308 A | 1/1996 | | |
| JP | 8-321306 A | 12/1996 | | |
| JP | 10-334915 A | 12/1998 | | |
| JP | 11-219700 A | 8/1999 | | |
| JP | 11-265716 A | 9/1999 | | |
| JP | 11-354122 A | 12/1999 | | |
| JP | 2000-58052 A | 2/2000 | | |
| JP | 2000-340232 A | 12/2000 | | |
| JP | 2001-110422 A | 4/2001 | | |
| JP | 2001-185149 A | 7/2001 | | |
| JP | 2002-75362 A | 3/2002 | | |
| JP | 2002-154814 A | 5/2002 | | |
| JP | 2002-260658 A | 9/2002 | | |
| JP | 2003173778 A | * | 6/2003 | ............ H01M 4/583 |
| JP | 2004-63321 A | 2/2004 | | |
| KR | 10-2005-0100505 A | 10/2005 | | |
| KR | 10-2012-0008455 A | 1/2012 | | |
| KR | 10-2013-0058466 A | 6/2013 | | |
| KR | 20130058466 A | * | 6/2013 | |
| KR | 10-2017-0031452 A | 3/2017 | | |
| KR | 10-2017-0048210 A | 5/2017 | | |
| KR | 10-2017-0054839 | 5/2017 | | |
| KR | 10-2017-0075661 A | 7/2017 | | |
| WO | WO 2012/127548 A1 | 9/2012 | | |
| WO | WO-2015186742 A1 | * | 12/2015 | ............ H01M 4/364 |
| WO | WO 2016/018023 A1 | 2/2016 | | |
| WO | WO-2016175539 A1 | * | 11/2016 | .......... H01M 10/056 |
| WO | WO-2017111542 A1 | * | 6/2017 | ............ H01M 4/133 |

OTHER PUBLICATIONS

English machine trnaslation of Eguchi (JP 2003-173778 A). (Year: 2003).*
Extended European Search Report for corresponding European Patent Application No. 18213952.7, dated Apr. 16, 2019, 8 pages.
"A Basic Guide to Particle Characterization," Malvern Instruments Worldwide—INFORM White Paper, May 2012, 26 pages, XP055089322.
Wong, Eunice K. et al., "Battery Separator Characterization and Evaluation Procedures for NASA's Advanced Lithium-Ion Batteries," NASA, May 2010, 70 pages, XP055608606.
EPO Office Action dated Jan. 28, 2020, for corresponding European Patent Application No. 18213952.7 (4 pages).
Japanese Patent Office Action for corresponding Japanese Patent Application No. 2005-112407, dated Nov. 10, 2009, 4 pages.
Japanese Patent Office Action for corresponding Japanese Patent Application No. 2005-112407, dated Feb. 2, 2011, 3 pages.
Uchiyama, Tomoyuki, et al.; Sphericity of Natural Carbon Graphite by means of Dry Impact Blending, Hokkaido Industrial Test Report, No. 301 (2002) pp. 163-166, with English Translation.
Office Action, with English Translation, for corresponding Chinese Patent Application No. 201811554281.X, dated Jul. 19, 2021 (18 pages).

* cited by examiner

NEGATIVE ELECTRODE ACTIVE MATERIAL FOR LITHIUM SECONDARY BATTERY, NEGATIVE ELECTRODE INCLUDING THE SAME, AND LITHIUM SECONDARY BATTERY INCLUDING THE NEGATIVE ELECTRODE

CROSS-REFERENCE TO RELATED APPLICATION

This application claims priority to and the benefit of Korean Patent Application No. 10-2017-0178736, filed on Dec. 22, 2017, in the Korean Intellectual Property Office, the entire content of which is incorporated herein by reference.

BACKGROUND

1. Field

Embodiments of the present disclosure relate to a negative electrode active material for a lithium secondary battery, a negative electrode including the same, and a lithium secondary battery including the negative electrode.

2. Description of the Related Art

Lithium batteries are used as power sources for portable electronic devices such as video cameras, mobile phones, laptops, or the like. For example, a rechargeable lithium secondary battery may be capable of high-speed charging and may have an energy density per unit weight that is more than three times the energy density per unit weight of existing lead storage batteries, nickel-cadmium batteries, nickel metal hydrogen batteries, and nickel-zinc batteries.

A lithium secondary battery produces electrical energy by oxidation and reduction reactions of lithium ions which are intercalated/deintercalated in a positive electrode and a negative electrode in a state where an organic electrolytic solution or a polymer electrolytic solution is filled between a positive electrode and a negative electrode that each include an active material capable of intercalating and deintercalating lithium ions.

A representative example of a negative electrode active material for a lithium secondary battery is a carbon-based material such as graphite. Such a carbon-based material is excellent in terms of battery safety since it allows lithium ions to be intercalated in a battery and to exist in a stable state.

A carbon-based material may include any suitable natural graphite and artificial graphite available in the art. Although natural graphite has a high energy density and a high energy capacity, capacity retention characteristics of natural graphite deteriorate over time due to cracking that occurs as a result of expansion during charging, and thus, artificial graphite is mainly used instead of natural graphite.

Recently, attempts have been made to prevent cracking of artificial graphite due to volume expansion during charging by finely refining graphite particles and mixing the particles with a binder to form a base graphite material, and then, by forming an additional coating layer on the base graphite material. However, volume expansion inhibition and improvement of lifetime characteristics have not yet been sufficiently achieved.

Therefore, a negative electrode active material that further inhibits volume expansion and has improved output and rate characteristics is desired.

SUMMARY

One or more embodiments of the present disclosure include a composite negative electrode active material having suppressed or reduced volume expansion and improved output and rate characteristics.

One or more embodiments include a negative electrode including the composite negative electrode active material.

One or more embodiments include a lithium secondary battery including the negative electrode.

One or more embodiments include a method of preparing the composite negative electrode active material.

Additional aspects of embodiments of the present disclosure will be set forth in part in the description which follows and, in part, will be apparent from the description, or may be learned by practice of the presented embodiments.

According to one or more embodiments, a composite negative electrode active material includes:

a first carbon-based material; and a second carbon-based material on a surface of the first carbon-based material, wherein the first carbon-based material and the second carbon-based material have respective particle diameters that are different from each other, and the second carbon-based material has a particle strength in a range of 100 MPa to 150 MPa and a Young's modulus in a range of 1.5 GPa to 4 GPa.

According to one or more embodiments, a method of preparing the composite negative electrode active material includes:

(a) mixing first carbon-based primary particles to form a mixture and aggregating the mixture to form first carbon-based secondary particles; and (b) sintering a mixture of the first carbon-based secondary particles and second carbon-based primary particles to form a composite negative electrode active material.

According to one or more embodiments, a negative electrode includes the composite negative electrode active material.

According to one or more embodiments, a lithium secondary battery includes the negative electrode.

BRIEF DESCRIPTION OF THE DRAWINGS

These and/or other aspects of embodiments will become apparent and more readily appreciated from the following description of the embodiments, taken in conjunction with the accompanying drawings in which.

DETAILED DESCRIPTION

Figure 1:
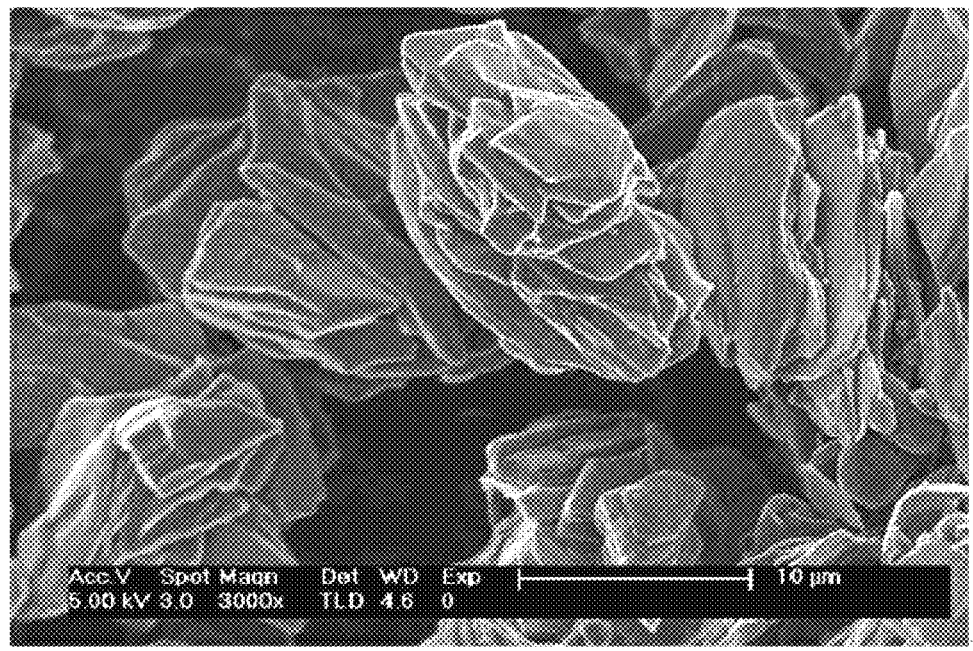
FIG. 1 is a scanning electron microscope (SEM) image showing a first carbon-based material of the artificial graphite secondary particles.

Hereinafter, a negative electrode active material for a lithium secondary battery according to an embodiment of the present disclosure and a lithium secondary battery including the same will be described in more detail with reference to the accompanying drawings. The present embodiments may have different forms and should not be construed as being limited to the descriptions set forth herein. The scope of the present disclosure is only defined the claims appended hereto, and equivalents thereof.

The term "composite," as used herein, does not refer to a state where a plurality of components having different properties are merely mixed and physically contacted, but instead refers to a state where components have a set or certain bonding relationship through mechanochemical, electrochemical, and/or chemical reactions that cannot be reached by a simple mixing process. For example, the term "composite negative electrode active material" refers to a negative electrode active material that is obtained through mechanochemical, electrochemical, and/or chemical reactions.

As described herein, when a portion "includes" an element, another element may be further included, rather than excluding the existence of the other element, unless otherwise described.

As used herein, the terms "first," "second," etc., may be used to describe a plurality of components having different properties, but the plurality of components should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

According to an aspect of an embodiment of the present disclosure, there is provided a composite negative electrode active material, including: a first carbon-based material; and a second carbon-based material positioned on a surface of the first carbon-based material, wherein the first carbon-based material and the second carbon-based material are different from each other According to an embodiment, the second carbon-based material has a particle strength in a range of 100 MPa to 150 MPa and a Young's modulus in a range of 1.5 GPa to 4 GPa.

Here, the particle strength refers to a value obtained by dividing the crush force of a particle by a cross-section area of a material, and is represented by <Formula 1>:

$$\text{particle strength} = a \times P / \pi (d/2)^2 \quad \text{Formula 1}$$

(wherein, a=2.8; P=applied force (N); d=particle diameter (μm))

The Young's modulus value refers to an initial slope value in a stress-strain curve, and is represented by <Formula 2>:

$$\text{Young's modulus}(E) = \text{Stress/strain degree} = \sigma/\varepsilon = (P/A)/(dl/I_0) \quad \text{Formula 2}$$

(wherein, σ=stress; ε=strain degree; P=applied force (N); A=area; dl=elongated length of a sample; $I_0$=initial length of a sample).

The particle strength and the Young's modulus are each used as an measurement of the physical strength of particles.

When the second carbon-based material having a particle strength in a range of 100 MPa to 150 MPa and a Young's modulus in a range of 1.5 GPa to 4 GPa is positioned on a surface of the first carbon-based material, the expansion of the first carbon-based material during charging may be effectively controlled or reduced. Consequently, the cracking of the composite negative electrode active material during charging and discharging may be prevented or reduced, thereby improving cycle characteristics and lifespan characteristics.

In the composite negative electrode active material according to an embodiment, the first carbon-based material may have a particle strength in a range of 15 MPa to 40 MPa and a Young's modulus in a range of 0.1 GPa to 0.4 GPa.

According to an embodiment, the first carbon-based material may include artificial graphite having a medium particle diameter ($D_{50}$) in a range of 15 μm to 30 μm. Here, the median particle diameter $D_{50}$ is defined as a particle diameter with respect to 50% accumulation in the particle diameter distribution of the particles (e.g., 50% of the mass of the first carbon-based material has a particle diameter smaller than that of the $D_{50}$ particle diameter).

When the median particle diameter $D_{50}$ of the first carbon-based material is within the range above, the density of a negative electrode formed by using a negative electrode active material including the first carbon-based material may be increased, thereby improving discharge capacity and cycle characteristics of a lithium secondary battery including the negative electrode.

When the medium particle diameter $D_{50}$ of the first carbon-based material is within the range above, a lithium secondary battery (a half-cell type or kind) prepared by using the first carbon-based material as the negative electrode active material may have a capacity, e.g., a discharge capacity herein, in a range of 355 mAh/g to 365 mAh/g.

In one embodiment, the first carbon-based material may include an artificial graphite secondary particle formed by agglomeration of a plurality of artificial graphite primary particles.

The artificial graphite secondary particles are agglomerates of the primary particles, and accordingly, may also include voids existing among the primary particles. Due to such voids existing among the primary particles, the secondary particles may increase a surface area in contact with lithium ions, and as a result, the capacity characteristics may be improved.

The first carbon-based material may have high capacity and high density characteristics, and such high capacity and high density characteristics may be identified by X-ray diffraction analysis and measurement of pellet density.

The first carbon-based material may have a (002) plane interval ($d_{002}$) in a range of 0.3355 nm to 0.3360 nm (e.g., a distance between 002 planes of the first carbon-based material may be in a range of 0.3355 nm to 0.3360 nm) as measured by X-ray diffraction analysis, and have pellet density in a range of 1.65 g/cc to 2.0 g/cc. According to a value of the (002) plane interval ($d_{002}$), the first carbon-based material is found to have a high degree of crystallinity, and according to a value of the pellet density, the first carbon-based material is found to have high density characteristic and excellent rolling properties. Thus, a negative electrode prepared by using the composite negative electrode active material including the first carbon-based material may accordingly have high density of the composite negative electrode active material as well as high capacity/high density characteristics.

In addition, the first carbon-based material may have a Lc/La ratio in a range of 0.95 to 1.05, where Lc is a crystallite size in a c-axis direction and La is a crystallite size in an a-axis direction, as determined by X-ray diffraction analysis. The first carbon-based material may also have an $I_{002}/I_{110}$ ratio in a range of 100 to 250, wherein $I_{002}$ is a peak intensity of the (002) plane and $I_{110}$ is a peak intensity of the (110) plane, as determined by X-ray diffraction analysis.

In the composite negative electrode active material according to an embodiment, the second carbon-based material may include artificial graphite primary particles having a median particle diameter $D_{50}$ in a range of 3 μm to 7 μm.

When the median particle diameter $D_{50}$ of the second carbon-based material median particle diameter is within the range above, the volume expansion of the composite negative electrode active material including the second carbon-based material during charging and discharging may be effectively suppressed or reduced. Furthermore, a negative electrode prepared by using the composite negative electrode active material including the second carbon-based material may increase the density of the composite negative electrode active material, and accordingly, a lithium secondary battery including the negative electrode may have an increased discharge capacity and improved cycle characteristics.

When the median particle diameter $D_{50}$ of the second carbon-based material median particle diameter is within the range above, a lithium secondary battery (a half-cell type or kind) prepared by using the second carbon-based material as the negative electrode active material may have a capacity, e.g., a discharge capacity herein, in a range of 330 mAh/g to 340 mAh/g.

The second carbon-based material may have high strength and high output characteristics, and such high strength and high output characteristics may be identified by X-ray diffraction analysis and measurement of pellet density.

The second carbon-based material may have a (002) plane interval ($d_{002}$) in a range of 0.336 nm to 0.337 nm (e.g. 0.3360 nm to 0.3365 nm) (e.g., a distance between 002 planes of the first carbon-based material may be in a range of 0.336 nm to 0.337 nm) as measured by X-ray diffraction analysis, and have pellet density in a range of 1.35 g/cc to 1.5 g/cc. In addition, the second carbon-based material may have a Lc/La ratio in a range of 0.6 to 0.9, where Lc is a crystallite size in a c-axis direction and La is a crystallite size in an a-axis direction, as determined by X-ray diffraction analysis. The second carbon-based material may also have an $I_{002}/I_{110}$ ratio in a range of 30 to 80, wherein $I_{002}$ is a peak intensity of the (002) plane and $I_{110}$ is a peak intensity of the (110) plane, as determined by X-ray diffraction analysis.

The first carbon-based material and the second carbon-based material may each independently be a material derived from at least one selected from hard carbon, soft carbon, and/or graphite. In addition, one of ordinary skill in the art may suitably or appropriately select and use the first carbon-based material or the second carbon-based material in consideration of suitability or satisfaction of the above-described properties.

The graphite may include natural graphite, flake graphite, high crystalline graphite, microcrystalline or cryptocrystalline graphite, amorphous graphite, and/or artificial graphite. Examples of the soft carbon include petroleum coke, coal coke, pitch coke, needle coke, coking coal coke, and polyvinyl carbon or polyvinyl chloride carbon. Examples of the hard carbon include carbon black, tetrose, cellulose, phenol resin, and furan resin.

In the composite negative electrode active material according to an embodiment, the second carbon-based material may cover at least a portion of the surface of the first carbon-based material.

In one embodiment, the second carbon-based material may be on the surface of the first carbon-based material in an island shape. For example, the second carbon-based material may be distributed in an island shape on (or across) the surface of the first carbon-based material.

The first carbon-based material may be subjected to volume expansion during a battery cycle, thereby degrading lifespan and safety of the battery. However, as the second carbon-based material is positioned on the surface of the first carbon-based material, the volume expansion of the battery may be effectively suppressed or reduced, and accordingly, the safety (e.g., penetration and pricking characteristics, etc.) of the battery may be also improved.

In addition, since the second carbon-based material is distributed in an island shape on the surface of the first carbon-based material, intercalation/deintercalation of lithium ions is not hindered (or is not substantially reduced). Thus, the output characteristics of the second carbon-based material are not degraded (or are not substantially degraded), but are rather excellent as being improved by high output characteristics of the second carbon-based material.

In one embodiment, a weight ratio of the first carbon-based material to the second carbon-based material may be in a range of 95:5 to 80:20.

For example, the weight ratio of the first carbon-based material to the second carbon-based material may be in a range of 90:10 to 80:20. For example, the weight ratio of the first carbon-based material to the second carbon-based material may be in a range of 95:5 to 85:15.

In one embodiment, the first carbon-based material may have a higher graphitization degree than that of the second carbon-based material. When the first carbon-based material has a high graphitization degree and a high capacity, the second carbon-based material may have a low capacity due to a lower graphitization degree than that of the first carbon-based, but is effective in terms of high output.

The term "graphitization degree," as used herein, refers to a proportion of a layered structure included in a carbon-containing material. Thus, having a high graphitization degree means that a carbon-containing material has a great portion of a layered structure.

In the composite negative electrode active material according to an embodiment, a carbon coating layer may be further included on the surface of the first carbon-based material, the surface of the second carbon-based material, or each surface of both the first carbon-based material and the second carbon-based material.

In one embodiment, the carbon coating layer may be positioned on a surface on which the second carbon-based material is not positioned among the surface of the second carbon-based material and the surface of the first carbon-based material.

In one or more embodiments, the carbon coating layer may be positioned only on the surface of the first carbon-based material.

The carbon coating layer may include amorphous carbon. For example, carbon included in the carbon coating layer may be a sintered product of a carbon precursor. Here, the carbon precursor may be any suitable material available in the art capable of producing a carbon-based material by a sintering process.

For example, the carbon precursor may be at least one selected from a polymer, coal tar pitch, petroleum pitch, meso-phase pitch, coke, low-molecular heavy distillate, coal-based pitch, derivatives thereof, and combinations thereof.

When the carbon coating layer is formed on the outermost portion of the composite negative electrode active material, a solid electrolyte interphase (SEI) layer may be formed. Accordingly, due to selective passage of Li+ions, metal particles may be prevented from contacting an electrolyte or the like (or a likelihood or amount of such contact may be reduced). Furthermore, the carbon coating layer may suppress or reduce the volume expansion during charging and discharging, and may also act as an electron transfer path in the composite negative electrode active material, thereby contributing to improvement of electrical conductivity.

An amount of the carbon coating layer may be 8 weight % or less based on the total weight of the negative electrode active material for the lithium secondary battery, but embodiments of the present disclosure are not limited thereto. The amount of the carbon coating layer may be in any suitable range as long as it does not hinder (or does not unacceptably reduce) the battery characteristics of the composite negative electrode active material.

A thickness of the carbon coating layer may be in a range of several nanometers to tens of nanometers. When the carbon coating layer is too thick, the carbon coating layer may act as a resistance layer during intercalation and deintercalation of lithium ions during charging and discharging, resulting in a decrease in capacity and a decrease in efficiency In one embodiment, the composite negative electrode active material may have a core-shell structure.

In one embodiment, the first carbon-based material may serve as a core portion, and the second carbon-based material may serve as a shell portion.

In the composite negative electrode active material according to an embodiment, the core portion may include artificial graphite secondary particles having high capacity/high density, and the shell portion may include artificial graphite primary particles having high strength/high output. The artificial graphite primary particles having high strength/high output in the shell portion may effectively suppress or reduce the expansion of the artificial graphite secondary particle in the core portion. Thus, the composite negative electrode active material having such a core-shell structure may retain high capacity/high density characteristics, and may also sufficiently suppress or reduce the volume expansion during charging and discharging, thereby improving lifespan characteristics.

In one or more embodiments, the composite negative electrode active material having such a core-shell structure may include the carbon coating layer.

For example, the carbon layer may be positioned between the core portion and the shell portion, or on the outermost portion of the composite negative electrode active material having such a core-shell structure.

In some embodiments, the first carbon-based material, the second carbon-based material, and the carbon coating layer are each independently the same as described above.

According to an aspect of an embodiment of the present disclosure, there is provided a method of preparing the composite negative electrode active material.

The method according to an embodiment includes:
(a) mixing first carbon-based primary particles to form a mixture and aggregating the mixture to form first carbon-based secondary particles; and
(b) sintering a mixture of the first carbon-based secondary particles and second carbon-based primary particles to form a composite negative electrode active material.

In one embodiment, after the active act (a) and before the active act (b), an additional amorphous carbon material may be provided to the first carbon-based secondary particles to form a carbon coating layer on the first carbon-based secondary particles.

In one or more embodiments, after the active act (b), an additional amorphous carbon material may be provided to the composite negative electrode active material obtained in active act (b) to form a carbon coating layer on the outermost portion of the negative electrode active material.

The forming of the carbon coating layer may include performing heat treatment at a temperature in a range of 950° C. to 1,200° C. When the heat treatment is performed at a temperature lower than 950° C., the carbon coating layer to be formed may not be uniform, and when the heat treatment is performed at a temperature above 1,200° C., carbon-based materials constituting the core-shell structure may be structurally deformed. Accordingly, the characteristics of a battery including the composite negative electrode active material may be degraded.

In one embodiment, the active act (a) may be performed in a reactor rotating at a speed in a range of 2000 rpm to 4000 rpm.

In one embodiment, to facilitate the aggregating of the first carbon-based primary particles in active act (a), adding an additional amorphous carbon material may be further included. Here, an amount of the additional amorphous carbon material may be suitably or appropriately selected from in consideration of the aggregation effect among the primary particles.

In one embodiment, after the active act (a), graphitizing the first carbon-based secondary particles may be further included. Here, the graphitizing may be performed at a temperature in a range of 2,800° C. to 2,950° C. in a reducing and/or inert atmosphere for 1 hour to 10 hours.

In active act (b), the sintering may be performed at a temperature in a range of 950° C. to 1,200° C. When the temperature at which the sintering is performed is below 950° C., the second carbon-based material may not be suitably or sufficiently bonded to the surface of the first carbon-based material, and when the temperature at which the sintering is performed exceeds 1,200° C., a composite negative electrode active material having a core-shell structure may not be easily obtained due to the structural deformation of the first carbon-based material.

According to an aspect of an embodiment of the present disclosure, there is provided a negative electrode for a lithium secondary battery. The negative electrode may include: a negative electrode current collector; and a negative electrode active material layer on at least one surface of the negative electrode current collector and including the composite negative electrode active material.

In one embodiment, the composite negative electrode active material may have an expansion rate of 4.5% or less at 25 charging and discharging cycles.

The negative electrode may include a binder between the negative electrode current collector and the negative electrode active material layer or in the negative electrode active material layer. The binder will be described in more detail herein below.

Embodiments of the negative electrode and a lithium secondary battery including the same may be manufactured, for example, in the following manner.

The negative electrode may include the composite negative electrode active material. For example, the composite negative electrode active material, a binder, and a selectively conducting agent may be mixed in a solvent to form a composite negative electrode active material composition. Then, the composite negative electrode active material composition may be molded in a regular shape or coated on a current collector such as a copper foil.

The binder used in the composite negative electrode active material composition is a component that assists in bonding of the current collector to the composite negative electrode active material or the conducting agent. The binder may be included between the negative electrode current collector and the negative electrode active material layer or in the negative electrode active material layer, at an amount in a range of 1 part by weight to 50 parts by weight based on 100 parts by weight of the composite negative electrode active material. For example, the binder may be added at an amount in a range of 1 part by weight to 30 parts by weight, 1 part by weight to 20 parts by weight, or 1 part by weight to 15 parts by weight, based on 100 parts by weight of the composite negative electrode active material.

Examples of the binder include polyvinylidene fluoride, polyvinylidene chloride, polybenzimidazole, poly(vinyl acetate), polyacrylonitrile, poly(vinyl alcohol), carboxymethylcellulose (CMC), starch, hydroxypropyl cellulose, regenerated cellulose, polyvinylpyrrolidone, tetrafluoroethylene, polyethylene, polypropylene, polystyrene, poly(methyl methacrylate), polyaniline, acrylonitrile butadiene styrene, phenol resin, epoxy resin, polyethylene terephthalate, polytetrafluoroethylene, polyphenylene sulfide, polyamide-imide, polyetherimide, polyethersulfone, polyamide, polyacetal, polyphenylene oxide, polybutylene terephthalate, ethylene-propylene-diene terpolymer (EPDM), sulfonated EPDM, styrene butadiene rubber (SBR), fluorine rubber, and various suitable copolymers thereof.

The negative electrode may further include a conducting agent selectively to provide a conductive path to the composite negative electrode active material, so as to further improve electrical conductivity. The conducting agent may be any suitable material generally used in a lithium battery, and examples thereof include: a carbon-based material such as carbon black, acetylene black, Ketjen black, carbon fiber (for example, vapor grown carbon fiber); a metallic material including powder or fiber of metal such as copper, nickel, aluminum, or silver; and a conducting agent such as a conducting polymer including a polyphenylene derivative or a mixture thereof.

The solvent may be N-methylpyrrolidone (NMP), acetone, or water. An amount of the solvent may be in a range of 1 part by weight to 10 parts by weight based on 100 parts by weight of the composite negative electrode active material. When the amount of the solvent is within the range above, an active material layer may be easily formed.

In addition, the negative electrode current collector may be formed to have a thickness in a range of 3 μm to 500 μm. The negative electrode current collector is not particularly limited as long as it is a conducting material without causing a chemical change (e.g., an unsuitable chemical change) in the battery. For example, the negative electrode current collector may be made of copper, stainless steel, aluminum, nickel, titanium, sintered carbon, copper or stainless steel surface-treated with carbon, nickel, titanium, or silver, or an aluminum-cadmium alloy. In addition, when fine irregularities are formed on the surface of the negative electrode current collector, the bonding of the negative electrode current collector to the composite negative electrode active material may be strengthened, and the negative electrode current collector may be used in various suitable forms including films, sheets, foils, nets, porous structures, foams, and non-woven fabrics.

The prepared composite negative electrode active material composition may be directly coated on the negative electrode current collector to prepare a negative electrode plate. Alternatively, the prepared composite negative electrode active material composition may be cast on a separate support, and a composite negative electrode active material film which is then separated from the support may be laminated on a copper foil current collector, to prepare a negative electrode plate. A negative electrode is not limited to the examples described above, and may be one of a variety of types (e.g., may have a variety of suitable compositions and/or arrangements).

The composite negative electrode active material composition may be used not only for the preparation of the electrodes for lithium secondary batteries, but also for the production of printable batteries printed on flexible electrode substrates.

Next, a positive electrode is prepared.

For example, a positive electrode active material, a conducting agent, a binder, and a solvent may be mixed to prepare a positive electrode active material composition. The positive electrode active material composition may be directly coated on a metallic current collector to prepare a positive electrode plate. Alternatively, the positive electrode active material composition may be cast on a separate support, and a film which is then separated from the support may be laminated on a metallic current collector to prepare a positive electrode plate. A positive electrode is not limited to the examples described above, and may be one of a variety of types (e.g., may have a variety of suitable compositions and/or arrangements).

The positive electrode active material may be any suitable material available in the art, and for example, may be a lithium-containing metal oxide. For example, the positive electrode active material may be at least one of a composite oxide of lithium with a metal selected from cobalt, manganese, nickel, and a combination thereof. The positive electrode active material may be a compound represented by one of the following formulae: $Li_aA_{1-b}B^1_bD^1_2$ (where $0.90 \leq a \leq 1.8$ and $0 \leq b \leq 0.5$); $Li_aE_{1-b}B^1_bO_{2-c}D^1_c$ (where $0.90 \leq a \leq 1.8$, $0 \leq b \leq 0.5$, and $0 \leq c \leq 0.05$); $LiE_{2-b}B^1_bO_{4-c}D^1_c$ (where $0 \leq b \leq 0.5$ and $0 \leq c \leq 0.05$); $Li_aNi_{1-b-c}Co_bB^1_cD^1_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB^1_cO_{2-\alpha}F^1_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1_cD^1_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB^1_cO_{2-\alpha}F^1_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$ and $0.001 \leq b \leq 0.1$); $Li_aCoG_bO_2$ (where $0.90 \leq a \leq 1.8$ and $0.001 \leq b \leq 0.1$); $Li_aMnG_bO_2$ (where $0.90 \leq a \leq 1.8$ and $0.001 \leq b \leq 0.1$); $Li_aMn_2G_bO_4$ (where $0.90 \leq a \leq 1.8$ and $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A may be selected from nickel (Ni), cobalt (Co), manganese (Mn), and combinations thereof; $B^1$ may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' may be selected from oxygen (O), fluorine (F), sulfur (S), phosphorus (P), and combinations thereof; E may be selected from cobalt (Co), manganese (Mn), and combinations thereof; $F^1$ may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q may be selected from titanium (Ti), molybdenum (Mo), manganese (Mn), and combinations thereof; $I^1$ may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

For example, the positive electrode active material may be $LiCoO_2$, $LiMn_xO_{2x}$ (where x=1, 2), $LiNi_{1-x}Mn_xO_{2x}$ (where 0<x<1), $LiNi_{1-x-y}Co_xMn_yO_2$ (where $0 \leq x \leq 0.5$ and $0 \leq y \leq 0.5$), and/or $LiFePO_4$.

The compounds listed above as positive electrode active materials may have a surface coating layer (hereinafter, also referred to as "coating layer") on a surface, or a mixture of a compound without the coating layer and a compound having the coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed using any suitable method that does not adversely affect (or does not unacceptably reduce) the physical properties of the positive electrode active material when the compound of the coating element is used. For example, the coating layer may be formed using a spray coating method, or a dipping method. Suitable coating methods should be readily understood by one of ordinary skill in the art upon reviewing the present disclosure, and thus, a detailed description thereof will not be provided here.

The conducting agent, the binder, and the solvent used for the preparation of the positive electrode active material composition may be the same (e.g., substantially the same) as those used in the preparation of the negative electrode active material composition.

Amounts of the positive electrode active material, the conducting agent, the binder, and the solvent may be the same (e.g., substantially the same) levels generally used in the art for lithium batteries. At least one of the conducting agent, the binder, and the solvent may be omitted according to the use and the structure of the lithium battery.

Next, a separator to be between the positive electrode and the negative electrode is prepared.

The separator for the lithium battery may be any suitable separator that is available for use in lithium batteries. In one embodiment, the separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator having a good organic electrolytic solution-retaining ability may be used for a lithium ion polymer battery. For example, the separator may be manufactured in the following manner.

In one embodiment, a polymer resin, a filler, and a solvent may be mixed together to prepare a separator composition. Then, the separator composition may be directly coated on an electrode, and then dried to form the separator. In one or more embodiments, the separator composition may be cast on a support and then dried to form a separator film, which may then be separated from the support and laminated on an electrode to form the separator.

The polymer resin used to manufacture the separator may be any suitable material that is available for use as a binder for electrode plates. Examples of the polymer resin include a vinylidenefluoride/hexafluoropropylene copolymer, polyvinylidene fluoride (PVDF), polyacrylonitrile, polymethylmethacrylate, and a mixture thereof.

An electrolyte is also prepared.

In one embodiment, the electrolyte may be an organic electrolyte solution. In one or more embodiments, the electrolyte may be in a solid phase. Examples of the electrolyte include boron oxide and lithium oxynitride. Any suitable material available as a solid electrolyte in the art may be used. In one or more embodiments, the solid electrolyte may be formed on the negative electrode by, for example, sputtering.

For example, the organic electrolyte solution may be prepared by dissolving a lithium salt in an organic solvent.

The organic solvent may include any suitable solvent available as an organic solvent in the art. For example, the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

The lithium salt may include any suitable material available as a lithium salt in the art. For example, the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are each independently a natural number), LiCl, LiI, or a mixture thereof.

Figure 6:
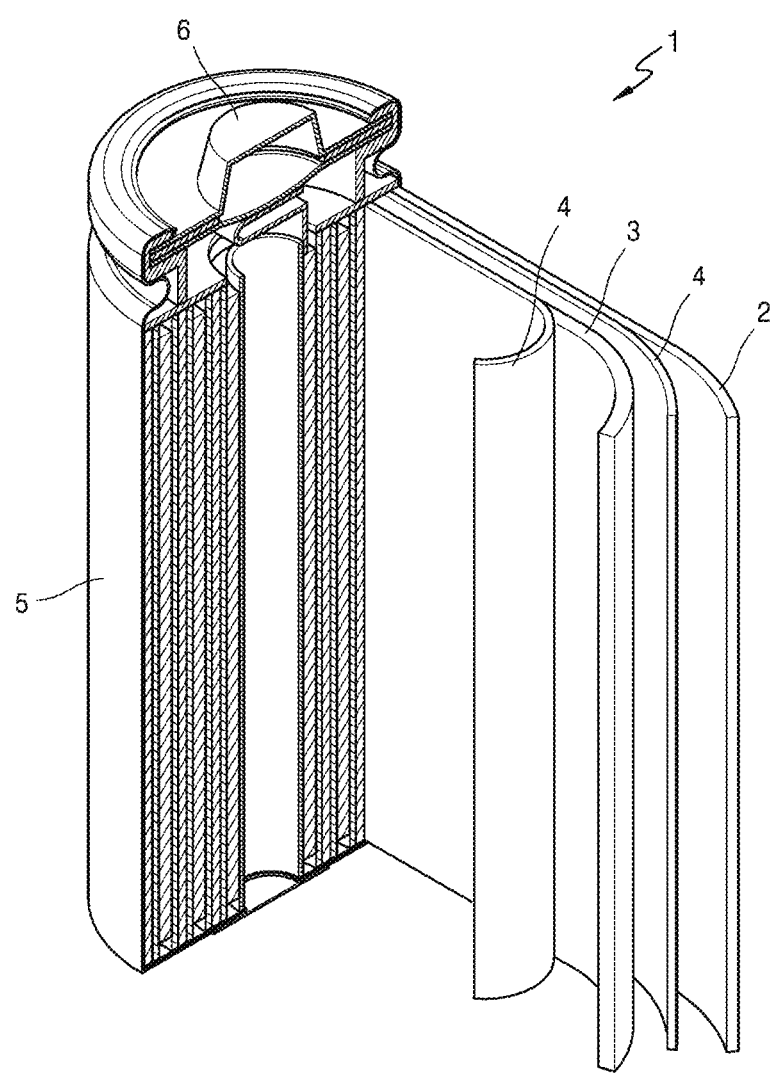
FIG. 6 is a schematic view of a structure of a lithium secondary battery according to an embodiment.

Referring to FIG. 6, a lithium battery 1 includes a positive electrode 3, a negative electrode 2, and a separator 4. The positive electrode 3, the negative electrode 2, and the separator 4 may be wound or folded, and then sealed in a battery case 5. Then, the battery case 5 may be filled with an organic electrolytic solution and sealed with a cap assembly 6, thereby completing the manufacture of the lithium battery 1. The battery case 5 may be a cylindrical type (or kind), a rectangular type (or kind), or a thin-film type (or kind). In one embodiment, the lithium battery 1 may be a thin-film type (or kind) of battery. In one or more embodiments, the lithium battery 1 may be a lithium ion battery.

In one embodiment, the separator may be between the positive electrode and the negative electrode to form a battery assembly. In one or more embodiments, the battery assembly may be stacked in a bi-cell structure and impregnated with the electrolytic solution. In one or more embodiments, the resultant assembly may be put into a pouch and hermetically sealed, thereby completing the manufacture of a lithium ion polymer battery.

In addition, a plurality of battery assemblies may be stacked to form a battery pack, which may be used in any suitable device that uses high capacity and high output, for example, in a laptop computer, a smart phone, or an electric vehicle.

In addition, the lithium battery may have improved lifetime characteristics and high rate characteristics, and thus, may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

Hereinafter, example embodiments will be described in further detail with reference to the following examples and comparative examples. However, these examples are provided for illustrative purposes only and are not intended to limit the scope of the present disclosure.

Preparation of Negative Electrode

EXAMPLE 1

Powders having a crystallite size in an a-axis direction of 100 nm and a crystallite size in a c-axis direction of 30 nm, a (002) plane interval ($d_{002}$) of 0.3350 nm, and a median particle diameter ($D_{50}$) of 10 μm were heat treated (graphitized) in a furnace with an inert gas and 2,800° C. atmosphere to prepare artificial graphite primary particles. Then, petroleum-based pitch and the artificial graphite primary particles were heat treated at a temperature of 1,500° C. for 12 hours to prepare artificial graphite secondary particles (coating amount: 2%-3%) coated with amorphous carbon having a median particle diameter $D_{50}$ of 20 μm and having the artificial graphite primary particles agglomerated therein. The SEM image of the obtained artificial graphite secondary particles is provided in FIG. 1.

Figure 2:
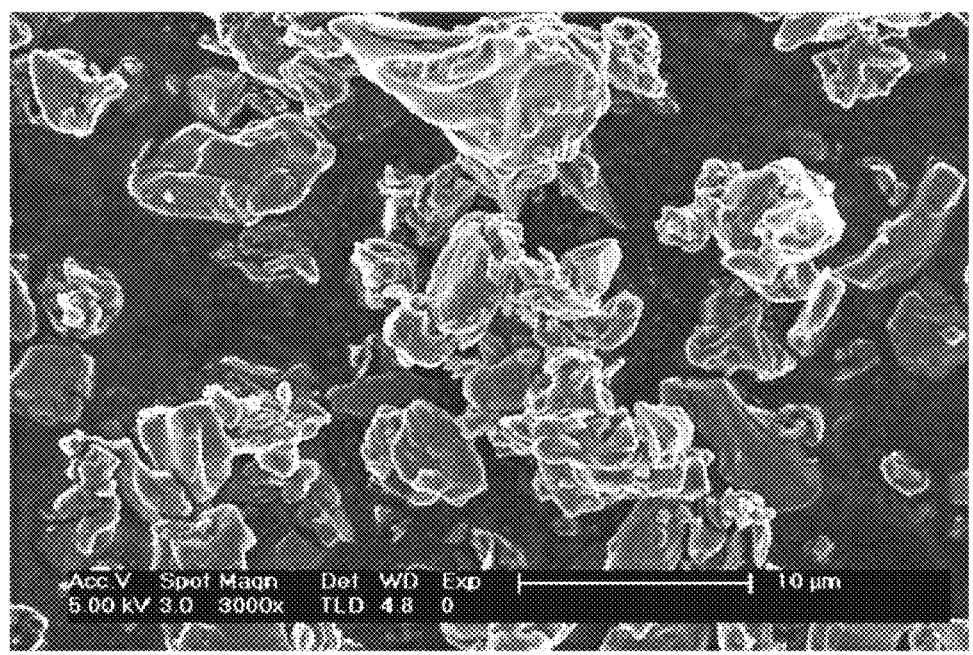
FIG. 2 is an SEM image showing a second carbon-based material of the high-strength and high-output artificial graphite primary particles.

80 weight % of the artificial graphite secondary particles, 20 weight % of high-strength and high-output artificial graphite primary particles having a crystallite size in an a-axis direction of 30 nm and a crystallite size in a c-axis direction of 20 nm, a (002) plane interval ($d_{002}$) in a range of 0.336 nm to 0.337 nm, and a particle diameter in a range of 5 μm to 7 μm, and petroleum-based pitch at an amount corresponding to 3 weight % to 5 weight % of active materials were mixed together to form a mixture, and the mixture was sintered at a temperature of 950° C., thereby preparing a composite negative electrode active material having a core-shell structure. The SEM image of the high-strength and high-output artificial graphite primary particles is provided in FIG. 2.

Figure 3:
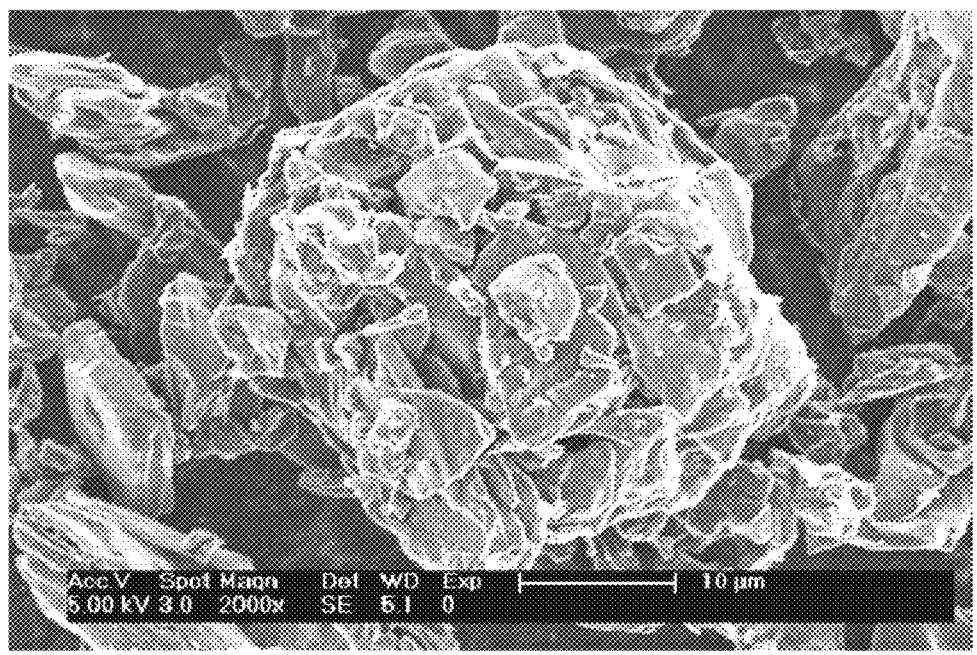
FIG. 3 is an SEM image showing a composite negative electrode active material in which a first carbon-based material and a second carbon-based material are combined with each other.

97.5 weight % of the prepared composite negative electrode active material, 1.0 weight % of carboxymethylcellulose (CMC), and 1.5 weight % of styrene butadiene rubber (SBR) were mixed together to form a slurry for a negative electrode active material. The slurry was then coated on a copper foil to a thickness of 80 μm, and the copper foil was rolled and dried, thereby preparing a negative electrode. The SEM image of the negative electrode is provided in FIG. 3.

COMPARATIVE EXAMPLE 1

A negative electrode was prepared in substantially the same manner as in Example 1, except that mesocarbon microbeads (MCMBs) were used instead of the artificial graphite secondary particles.

COMPARATIVE EXAMPLE 2

Powders having a crystallite size in an a-axis direction of 100 nm and a crystallite size in c-axis direction of 30 nm, a (002) plane interval ($d_{002}$) of 0.3350 nm, and a median particle diameter $D_{50}$ of 10 μm were heat treated (graphitized) in a furnace with an inert gas and 2,800° C. atmosphere to prepare artificial graphite primary particles. Then, petroleum-based pitch and the artificial graphite primary particles were heat treated at a temperature of 1,500° C. for 12 hours to prepare artificial graphite secondary particles (coating amount: 2%-3%) coated with amorphous carbon having a median particle diameter $D_{50}$ of 20 μm and having the artificial graphite primary particles agglomerated therein.

97.5 weight % of artificial graphite secondary particles, 1.0 weight % of CMC, and 1.5 weight % of SBR were mixed together to form a slurry for a negative electrode active material. The slurry was then coated on a copper foil to a thickness of 80 μm, and the copper foil was rolled and dried, thereby preparing a negative electrode.

COMPARATIVE EXAMPLE 3

A negative electrode was prepared in substantially the same manner as in Comparative Example 2, except that MCMBs were used instead of the artificial graphite secondary particles.

COMPARATIVE EXAMPLE 4

A negative electrode was prepared in substantially the same manner as in Comparative Example 2, except that artificial graphite primary particles were used instead of the artificial graphite secondary particles.

COMPARATIVE EXAMPLE 5

A negative electrode was prepared in substantially the same manner as in Comparative Example 2, except natural graphite secondary particles were used instead of the artificial graphite secondary particles.

COMPARATIVE EXAMPLE 6

The artificial graphite primary particles were mixed and agglomerated with petroleum-based pitch in a rotating reactor to form artificial graphite secondary particles. 80 weight % of the artificial graphite secondary particles, 20 weight % of additional artificial graphite primary particles, and petroleum-based pitch at an amount corresponding to 5 weight % of the weight of the artificial graphite secondary particles and the additional artificial graphite primary particles were mixed together to form a mixture, and the mixture was heat treated at a temperature of 950° C. to form a composite negative electrode active material in which the artificial graphite secondary particles and the artificial graphite primary particles were agglomerated together.

97.5 weight % of the composite negative electrode active material, 1.0 weight % of CMC, and 1.5 weight % of SBR were mixed together to form a slurry for a negative electrode active material. The slurry was then coated on a copper foil to a thickness of 80 μm, and the copper foil was rolled and dried, thereby preparing a negative electrode.

Preparation of Pouch-Type Cell

EXAMPLE 2

The negative electrode of Example 1, a LiCoO$_2$(LCO) positive electrode as a counter electrode, and an electrolyte dissolved in mixed solvent of ethylene carbonate (EC), propyl carbonate (PC), ethylenemethylene carbonate (EMC), and dimethyl carbonate (DMC) (EC:PC:EMC: DMC at a volume ratio of 2:1:4:3) such that a concentration of LiPF$_6$ was 1.15 M were used to prepare a pouch-type cell (e.g., a pouch-shaped cell).

COMPARATIVE EXAMPLES 7 to 12

Pouch-type cells (e.g., pouch-shaped cells) were each prepared in substantially the same manner as in Example 2, except that the negative electrodes of Comparative Examples 1 to 6 were each used.

EVALUATION EXAMPLE 1 (Regarding Expansion Characteristics)

Each of the pouch-type cells of Examples 2 and Comparative Examples 7 to 12 was subjected to 25 charging and discharging cycles, and then, the expansion characteristics of the pouch-type cells were compared for analysis. A thickness of the each of the pouch-type cells was measured by using a real-time thickness measuring meter. Here, a thickness expansion rate (%) was calculated as (thickness at 25$^{th}$ cycle of charging and discharging/thickness at 1$^{st}$ cycle of charging and discharging)×100. The results are shown in FIG. 4.

Figure 4:
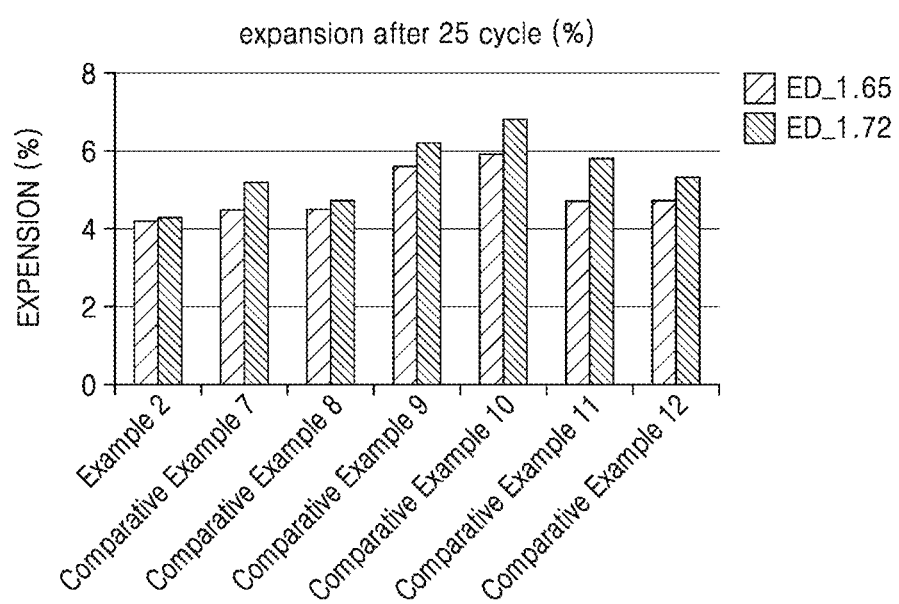
FIG. 4 is a graph showing expansion rates of pouch-type cells (e.g., pouch-shaped cells) prepared according to Example 2 and Comparative Examples 7 to 12 after 25 charging and discharging cycles of the pouch-type cells.

Referring to FIG. 4, it was confirmed that the pouch-type cell of Example 2 using the negative electrode of Example 1 including the composite negative electrode active material which was prepared by using the artificial graphite secondary particle and the high-strength/high-output artificial graphite primary particles showed excellent expansion rate compared to the pouch-type cells of Comparative Examples 7 to 12.

In addition, it was confirmed that the pouch-type cell of Example 2 showed improved expansion rate compared to the pouch-type cells of Comparative Examples 7 to 12 each including the composite negative electrode active material of Comparative Example 2 in which the high-strength/high-output artificial graphite primary particles were not used.

Furthermore, it was also confirmed that the pouch-type cell of Comparative Example 7 including the composite negative electrode active material of Comparative Example 1 in which the MCMBs were used instead of the artificial graphite secondary particles showed significantly improved expansion rate as compared to the pouch-type cell of Comparative Example 9 including the negative electrode of Comparative Example 3 in which only the MCMBs were used.

Therefore, it was confirmed that the high-strength/high-output artificial graphite primary particles included in the composite negative electrode active material have the effect of suppressing (or reducing) the expansion rate of the composite negative electrode active material.

In addition, it was confirmed that the pouch-type cell of Example 2 showed a low expansion rate as compared to the pouch-type cell of Comparative Example 12 including the negative electrode active material of Comparative Example 6 in which the artificial graphite secondary particles were simply mixed with the artificial graphite primary particles.

EVALUATION EXAMPLE 2 (Regarding Capacity Characteristics)

For the first cycle of charging and discharging, each of the lithium secondary batteries of Example 2 and Comparative Examples 7 to 12 was started to be charged at room temperature at a charge rate of 0.1 C-rate until the voltage reached 10 mV such that charging was performed at a constant current, and then, performed at a constant voltage until the current reached 0.01 C. The completely charged lithium secondary batteries had a 20-minute quiet time (dwell time), and then, were discharged at a constant current of 0.1 C-rate until the voltage reached 1.5 V. For the second cycle of charging and discharging, each of the lithium secondary batteries of Example 2 and Comparative Examples 7 to 12 was started to be charged at a charge rate of 0.2 C-rate until the voltage reached 10 mV such that charging was performed at a constant current, and then, performed at a constant voltage until the current reached 0.01 C. The completely charged lithium secondary batteries had a 20-minute quiet time (dwell time), and then, were discharged at a constant current of 0.2 C-rate until the voltage reached 1.5 V.

Afterwards, the same cycle of charging and discharging was repeated, and the discharge capacity at the second cycle of charging and discharging was measured. The results are shown in FIG. 5.

Figure 5:
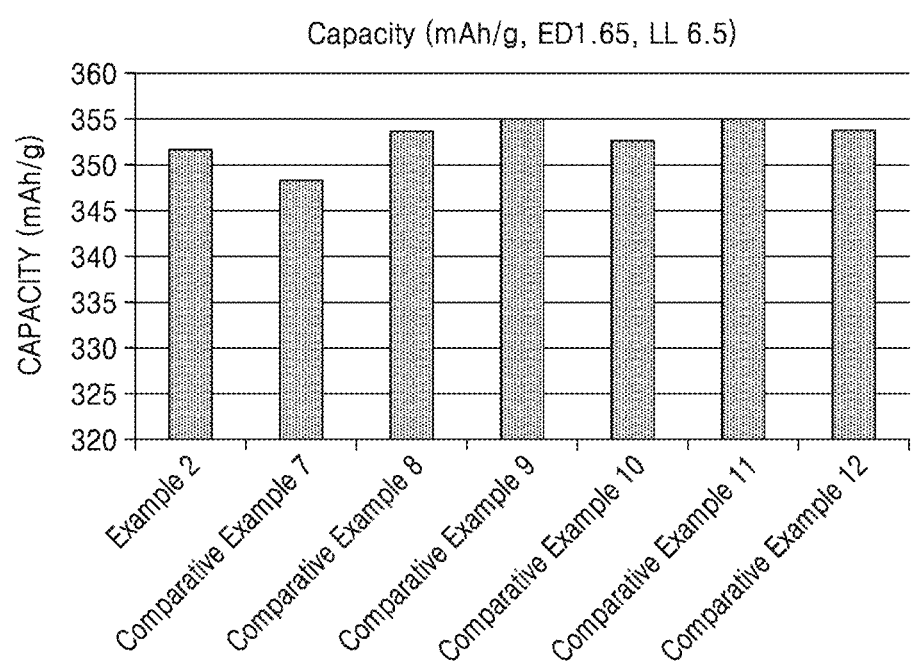
FIG. 5 is a graph showing capacity characteristics of pouch-type cells prepared according to Example 2 and Comparative Examples 7 to 12.

Referring to FIG. 5, it was confirmed that the pouch-type cell of Example 2 had equivalent discharge capacity as the pouch-type cells of Comparative Examples 7 to 12.

Overall, referring to FIGS. 4-5, the lithium secondary batteries each including the negative electrode which includes the composite negative electrode active material having a core-shell structure including (or consisting of) the artificial graphite secondary particles and the high-strength/high-output primary particles were able to reduce the expansion rate without loss of capacity, and thus, the stability may be improved while excellent lifespan characteristics may be retained.

According to the one or more embodiments, when a lithium secondary battery includes a composite negative electrode active material having a first carbon-based material and a second carbon-based material positioned on a surface of the first carbon-based material and having a set or specific particle strength and Young's modulus values, the lithium secondary battery may have improved output, high rate characteristics, and lifespan characteristics.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims, and equivalents thereof.

What is claimed is:

1. A composite negative electrode active material comprising:
   a first carbon-based material; and
   a second carbon-based material on a surface of the first carbon-based material,
   wherein the second carbon-based material consists of artificial graphite primary particles having a particle strength in a range of 100 MPa to 150 MPa,
   wherein the first carbon-based material has a pellet density in a range of 1.65 g/cc to 2.0 g/cc,
   wherein the second carbon-based material has a pellet density in a range of 1.35 g/cc to 1.5 g/cc,
   wherein the first carbon-based material and the second carbon-based material have respective particle diameters that are different from each other, and
   wherein the first carbon-based material has a Young's modulus in a range of 0.1 GPa to 0.4 GPa.

2. The composite negative electrode active material of claim 1, wherein the first carbon-based material has a particle strength in a range of 15 MPa to 40 MPa.

3. The composite negative electrode active material of claim 1, wherein the first carbon-based material has a median particle diameter ($D_{50}$) in a range of 15 μm to 30 μm.

4. The composite negative electrode active material of claim 1, wherein the first carbon-based material comprises an artificial graphite secondary particle formed by agglomeration of a plurality of artificial graphite primary particles.

5. The composite negative electrode active material of claim 1, wherein the artificial graphite primary particles have a median particle diameter ($D_{50}$) in a range of 5 μm to 7 μm.

6. The composite negative electrode active material of claim 1, wherein a ratio ($I002/I110$) of a peak intensity ($I_{002}$) of the (002) plane to a peak intensity ($I_{110}$) of the (110) plane in X-ray diffraction of the second carbon-based material is in a range of 30 to 80.

7. The composite negative electrode active material of claim 1, wherein a weight ratio of the first carbon-based material to the second carbon-based material is in a range from 95:5 to 80:20.

8. The composite negative electrode active material of claim 1, wherein a graphitization degree of the first carbon-based material is higher than that of the second carbon-based material.

9. The composite negative electrode active material of claim 1, wherein the composite negative electrode active material further comprises a carbon coating layer on:
   a surface of the first carbon-based material,
   a surface of the second carbon-based material, or
   both the surface of the first carbon-based material and the surface of the second carbon-based material.

10. The composite negative electrode active material of claim 9, wherein an amount of the carbon coating layer is 8 percent by weight or less based on the total weight of the composite negative electrode active material.

11. The composite negative electrode active material of claim 9, wherein the carbon coating layer consists of at least one selected from a polymer, coal tar pitch, petroleum pitch, meso-phase pitch, coke, heavy distillate, coal-based pitch, and a derivative thereof.

12. The composite negative electrode active material of claim 1, wherein the composite negative electrode active material has a core-shell structure.

13. The composite negative electrode active material of claim 1, the second carbon-based material has a Young's modulus in a range of 1.5 GPa to 4 GPa.

14. A method of preparing the composite negative electrode active material of claim 1, the method comprising:
- (a) mixing first carbon-based primary particles to form a mixture and aggregating the mixture to form the first carbon-based material; and
- (b) sintering a mixture of the first carbon-based material and the second carbon-based material to form the composite negative electrode active material.

15. The method of claim 14, further comprising:
after the step (a) and before the step (b), providing an amorphous carbon material to the first carbon-based material to form a carbon coating layer on the first carbon-based material.

16. The method of claim 14, further comprising,
after the step (b), providing an amorphous carbon material to the composite negative electrode active material to form a carbon coating layer on an outermost portion of the composite negative electrode active material.

17. A negative electrode for a lithium secondary battery, comprising the composite negative electrode active material of claim 1.

18. The negative electrode of claim 17, wherein the composite negative electrode active material exhibits an expansion rate of 4.5% or less after 25 charge/discharge cycles.

* * * * *